United States Patent [19]
Karabinos

[11] 3,868,399
[45] Feb. 25, 1975

[54] CHLORINATED ALKOXYPHENYLISOCYANATES

[75] Inventor: Joseph V. Karabinos, Orange, Conn.

[73] Assignee: Carbolabs, Inc., Bethany, Conn.

[22] Filed: Dec. 20, 1972

[21] Appl. No.: 317,006

[52] U.S. Cl.... 260/453 AR, 260/453 PH, 260/471 C, 260/553 A, 260/999
[51] Int. Cl............................................ C07c 119/04
[58] Field of Search ............................ 260/453 AR

[56] References Cited
UNITED STATES PATENTS
3,488,376   1/1970   Ulrich ................................ 260/453

FOREIGN PATENTS OR APPLICATIONS
1,263,328   2/1972   Great Britain

Primary Examiner—Lewis Gotts
Assistant Examiner—Dolph H. Torrence
Attorney, Agent, or Firm—Robert H. Bachman

[57] ABSTRACT

Novel chlorinated aromatic isocyanates having the formula

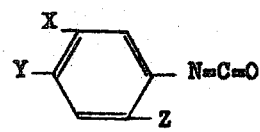

wherein X is selected from the group consisting of chlorine and hydrogen, Y is selected from the group consisting of chlorine, hydrogen and alkoxy containing from 1 to 4 carbon atoms and Z is alkoxy containing from 1 to 4 carbon atoms, provided that when X is hydrogen Y must be chlorine, and the process for preparing same.

3 Claims, No Drawings

CHLORINATED ALKOXYPHENYLISOCYANATES

BACKGROUND OF THE INVENTION

Isocyanates are highly desirable and reactive materials which are useful for a variety of applications. They are reactive intermediates which can be utilized to prepare a variety of materials; for example, the isocyanates are widely used in the preparation of polyurethane foams. Chlorinated isocyanates in particular are desirable since the chlorine offers a potential advantage in fire retardance and agricultural activity.

Accordingly, it is a principal object of the present invention to provide novel isocyanates and a process for preparing same.

It is a particular object of the present invention to provide novel chlorinated alkoxy aromatic isocyanates and a convenient, inexpensive method for preparing same.

Further objects and advantages of the present invention will appear from the ensuing specification.

SUMMARY OF THE INVENTION

In accordance with the present invention it has now been found that the foregoing objects and advantages may be readily obtained and novel chlorinated alkoxy aromatic isocyanates provided having the formula

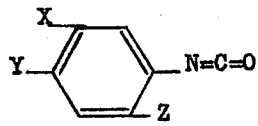

wherein X is selected from the group consisting of chlorine and hydrogen, Y is selected from the group consisting of chlorine, hydrogen and alkoxy containing from 1 to 4 carbon atoms and Z is alkoxy containing from 1 to 4 carbon atoms, provided that when X is hydrogen Y must be chlorine. The alkoxy groups are preferably methoxy and the preferred material is the 4-chloro-2-methoxyphenylisocyante. Similarly, the process of the present invention is simple, convenient and expeditious and well suited to a commercial operation. The process comprises simply reacting together a compound having the formula

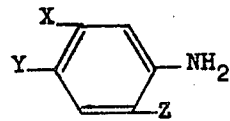

wherein X, Y and Z are as defined above and an excess of phosgene in a solvent and recovering the resultant isocyanate. The materials should be reacted together at a temperature of from ambient to reflux temperature for from 1 to 24 hours with HCl being evolved as a reaction product.

DETAILED DESCRIPTION

As indicated hereinabove, the compositions of the present invention are chlorinated alkoxy aromatic isocyanates having the formula set forth. The alkoxy group is preferably methoxy and the 4-chloro-2-methoxyphenylisocyanate is preferred. A distinguishing feature of the chloromethoxyphenylisocyanates in particular, is that certain carbamate derivatives of these compounds are characterized by their substantivity to proteins and particularly to the keratins.

The compounds may be conveniently and readily prepared in accordance with the process of the present invention, as set forth hereinabove. Thus, the corresponding aniline is simply reacted with an excess of phosgene in a solvent. For example, the 4-chloro-2-methoxy aniline or 4-chloro-2-anisidine is simply reacted with an excess of phosgene to form the corresponding 4-chloro-2-methoxyphenylisocyanate and HCl.

The reaction may be conducted at from ambient temperatures to reflux, and is preferably conducted at from 30° to 7°C. The reaction is mildly exothermic, with the temperature slowly rising during the reaction. Normally reaction times of from 1 to 8 hours are adequate, although times of up to 24 hours may be utilized, if desired. Any convenient non-reactive solvent may be used, such as toluene, xylene, nitrobenzene, benzene, etc. HCl is evolved as a by-product and the isocyanate product readily recovered in high yields by distillation.

The isocyanates of the present invention are very reactive intermediates which convert amines into ureas, alcohols and phenols into carbamates (urethanes) and react with virtually any organic compound having an active hydrogen atom. Diisocyanates are used similarly, e.g., with polyols to prepare urethane foams. The monoisocyanates of the present invention may be incorporated into these polymers as chain stoppers, particularly in view of their chlorine content which makes them useful. Derivatives of the compounds of the present invention are potentially useful biological agents, especially in the area of herbicides, insecticides and drugs.

The present invention will be more readily understandable from a consideration of the following illustrative examples.

EXAMPLE I

Preparation of 4-chloro-2-Methoxyphenylisocyanate

To a 12 liter three-necked flask equipped with a dropping funnel, mechanical stirrer, gas inlet tube and condenser containing an outlet tube attached to a caustic gas scrubber was added 2 liters of ethyl acetate (water-free). Phosgene was passed into the solvent at room temperature until about 80 gm. had been added and 1 kilogram of 4-chloro-2-anisidine (6.4 moles) dissolved in 1 liter of ethyl acetate was added dropwise over a 2 hour period along with the continuous addition of phosgene maintaining an excess of phosgene at all times. A total of 693 gm. of phosgene representing approximately a 10 percent excess was employed. During this addition the temperature remained at 30° C + 5°. After the addition was completed the cloudy solution heated and the solvent and excess phosgene removed by distillation during which time hydrogen chloride was evolved over a period of approximately 3 hours with the temperature rising slowly to about 85° C. The residual clear oil was subjected to vacuum distillation at 2 mm Hg. pressure and the fraction boiling at 102°–4° C. was collected and weighed 1,050 grams representing a 90.2 percent yield. The 4-chloro-2-methoxyphenylisocyanate solidified on standing and gave a melting point of 60°–61.5° C.

Anal.Calcd. for C$_8$H$_6$ClNO$_2$: C, 52.33%, H, 3.29%, N, 7.62%
Found: C, 52.20%, H, 3.31%, N, 7.63%

Isocyanate Content by Titration: 98.6%

EXAMPLE II

Preparation of 5-chloro-2-Methoxyphenylisocyanate

The reaction was conducted in a manner after Example I utilizing 3 liters of ethyl acetate as solvent and 6.4 moles of 5-chloro-2-methoxy aniline. A total of 693 grams of phosgene was added representing a 10 percent excess. The fraction boiling at about 105° C. at 1 mm. Hg. was collected and weighed 1,020 grams representing a 88 percent yield. The 5-chloro-2-methoxyphenylisocyanate solidified on standing and gave a melting point of 56°–57° C.

Anal.Calcd. for C$_8$H$_6$ClNO$_2$: C, 52.33%, H, 3.29%, N, 7.62%
Found: C, 52.28%, H, 3.23%, N, 7.53%

Isocyanate Content by Titration: 99.3%

EXAMPLE III

Preparation of 5-Chloro-2,4-Dimethoxyphenylisocyanate

The reaction was conducted in a manner after Example I utilizing 3 liters of ethyl acetate as solvent and 4.8 moles (900 g.) of 5-chloro-2,4-dimethoxy aniline. A total of 525 grams of phosgene was added representing a 10 percent excess. The fraction boiling at about 155° C. at 4 mm. Hg. was collected and weighed 930 grams representing a 91 percent yield. The 5-chloro-2,4-dimethoxyphenylisocyanate solidified on standing and gave a melting point of 96–98° C.

Anal.Calcd. for C$_9$H$_8$ClNO$_3$: C, 50.60%, H, 3.78%, N, 6.56%
Found: C, 50.75%, H, 3.68%, N, 6.50%

Isocyanate Content by Titration: 99.2%

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A composition of matter having the following formula

wherein X is selected from the group consisting of chlorine and hydrogen, Y is selected from the group consisting of chlorine and hydrogen and Z is methoxy, provided that when X is hydrogen Y must be chlorine and when X is chlorine Y must be hydrogen.

2. 4-Chloro-2-methoxyphenylisocyanate
3. 5-Chloro-2-methoxyphenylisocyanate.

* * * * *